(12) United States Patent
Donahue

(10) Patent No.: US 8,739,175 B2
(45) Date of Patent: May 27, 2014

(54) SYSTEM AND METHOD FOR REROUTING A REQUEST BETWEEN VIRTUALIZATION SERVICES

(75) Inventor: James Donahue, Sunnyvale, CA (US)

(73) Assignee: Adobe Systems Incorporated, San Jose, CA (US)

( * ) Notice: Subject to any disclaimer, the term of this patent is extended or adjusted under 35 U.S.C. 154(b) by 615 days.

(21) Appl. No.: 12/974,341

(22) Filed: Dec. 21, 2010

(65) Prior Publication Data

US 2014/0040884 A1    Feb. 6, 2014

(51) Int. Cl.
| | |
|---|---|
| G06F 9/46 | (2006.01) |
| G06F 15/173 | (2006.01) |
| G06F 9/50 | (2006.01) |
| G06F 9/52 | (2006.01) |
| G06F 9/445 | (2006.01) |
| H04L 12/24 | (2006.01) |
| G06F 9/455 | (2006.01) |
| G06F 9/48 | (2006.01) |
| H04L 12/56 | (2006.01) |

(52) U.S. Cl.
CPC ............ *G06F 9/5088* (2013.01); *G06F 9/5083* (2013.01); *G06F 9/505* (2013.01); *G06F 9/52* (2013.01); *G06F 8/63* (2013.01); *G06F 9/45558* (2013.01); *G06F 9/461* (2013.01); *G06F 9/4856* (2013.01); *H04L 41/0213* (2013.01); *H04L 45/22* (2013.01)

USPC ................ 718/105; 718/104; 709/223

(58) Field of Classification Search
None
See application file for complete search history.

(56) References Cited

U.S. PATENT DOCUMENTS 6,990,662 B2 * 1/2006 Messer et al. ................ 718/104
8,296,759 B1 * 10/2012 Hutchins et al. ............. 709/223

* cited by examiner

*Primary Examiner* — Meng An
*Assistant Examiner* — Bing Zhao
(74) *Attorney, Agent, or Firm* — Schwegman Lundberg & Woessner, P.A.

(57) ABSTRACT

A system is provided to reroute a request received within one virtualization service for processing within another virtualization service. The system comprises an offload manager, and a response service module. The offload manager may be configured to determine that an overflow request from a client computer system is suitable for being processed at a computer system provided within a second virtualization service and, in response, reroute the overflow request to a computer system provided within a second virtualization service. The response service module may be configured to receive a result of processing of the overflow request from the computer system provided within the second virtualization service and prepare the received result for communicating to the client computer system.

21 Claims, 5 Drawing Sheets

SYSTEM AND METHOD FOR REROUTING A REQUEST BETWEEN VIRTUALIZATION SERVICES

This disclosure relates generally to the technical fields of software and/or hardware technology and, in one example embodiment, to system and method to reroute a request received within one virtualization service for processing within another virtualization service.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

The phrase "cloud computing" refers to an architectural paradigm, in which computation is moved from local servers to a remote service that provides computation as a commodity or utility. A "cloud" is typically a large collection of shared commodity computation resources that can be interchangeably provisioned in response to clients' computation requests. Cloud computing is frequently used in software-as-a-service (SaaS) application architectures and may be viewed as an implementation choice for application deployment that leverages shared resources and improved cost structure of the cloud. A cloud computing approach may be used to implement a variety of computational paradigms, such as virtual machines, jobs, remote procedure calls, traditional servers, etc.

BRIEF DESCRIPTION OF DRAWINGS

Embodiments are illustrated by way of example and not limitation in the figures of the accompanying drawings, in which like references indicate similar elements and in which.

DETAILED DESCRIPTION

Figure 1:
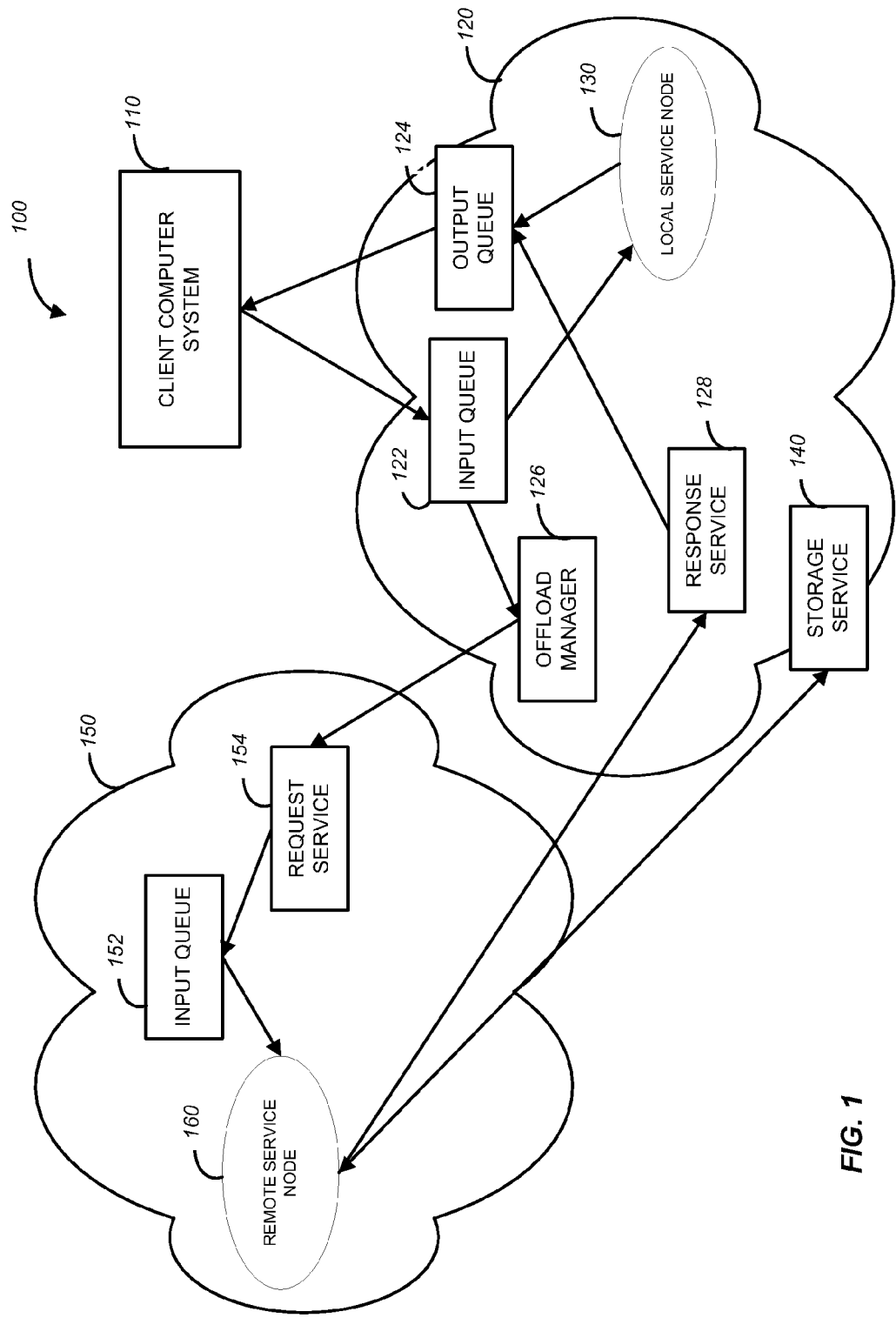
FIG. 1 is a diagrammatic representation of a cloud bursting architecture, in accordance with an example embodiment.

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

A computing application (also referred to as merely an application) may be made available to users by deploying the application on one or more virtual instances of a machine running on a cloud, i.e., within a public or a private virtualization space. A virtualization space (also referred to as a cloud) may be provided by different providers. As each virtualization space provider may utilize a proprietary set of APIs that need to be used by applications, a virtualization space provided by a particular provider may require a specific set of accommodations that would need to be implemented with respect to a computing application in order to deploy that application on a cloud using that particular provider's virtualization space.

A computing application may be launched on a cloud by instructing the cloud provider to access one or more machine images containing the application description and load the one or more machine images onto the physical machines provided by the cloud provider and make it accessible to the user via a network. A machine image is a read-only boot image that is used for launching an instance of a virtual machine running one or more components of the requested computing application. One or more machine images representing a computing application may be provided to a network storage system (e.g., Amazon S3) by a control server (also referred to as a controller).

A system that provisions and manages a computing application hosted on one or more virtual instances of a machine may be referred to as a hosted service system. A hosted service system may be configured to provide automated administration of a computing application, replacing the administration tasks that would otherwise be performed by the customer when running in an on-premise production deployment. The technology within an example hosted service system may hide the behavior of the underlying virtualization service, and provide instances of a computing application that are substantially indistinguishable (e.g., in terms of reliability, security, and performance) from local on-premise deployments of the computing application. For example, a hosted service system may provision and manage computing applications such as a generic content server, Adobe® LiveCycle® Enterprise Suite (ES) and Adobe® ConnectPro® offered by Adobe Systems Incorporated, etc. While embodiments of the smart scheduler are described with reference to Amazon EC2 service, other virtualization services may be utilized.

In operation, a user can access a provider's web site and request to launch a computing application that can be deployed remotely on a plurality of virtual instances of a machine (on a cloud) such that the user no longer is required to deploy the computing application locally, within their own data center, on their own hardware. A request may be triggered by a user, e.g., by activating a visual control such as a "Start" button presented on a web page. The control server forwards the request to the access interface of the network storage, which causes the bootstrapping sequence to be started. The bootstrapping of the implementation object involves establishing a connection to the cloud provider's service and setting up initial databases and file buckets as required.

When a computing application, a content server for example, is executing in a cloud, requests from a client computer system directed to the content server are queued in an input queue that is maintained by the virtualization service. Depending on the nature of an application provisioned by the hosted service for executing within a virtualization service (in a cloud), it may be beneficial to utilize more than one cloud infrastructure offered, respectively, by different virtualization service providers. For example, where an input queue maintained by the virtualization service provider appears to be oversubscribed, it may be desirable to offload some of the requests from the input queue to an input queue maintained by another virtualization service provider, so that these requests are processed by one or more instances of a virtual machine (also referred to as nodes) provided by that other virtualization service provider. Such rerouting of a request received within one virtualization service for processing within another virtualization service may be termed "cloud bursting."

In one example embodiment, cloud bursting may be implemented where a computing application is executing one or more stateless services that can be replicated across multiple clouds. A stateless service is a service that does not require state information to be maintained from one request to another, such that each request is self-contained. Examples of such services include document services, e.g., services provided by Adobe® LiveCycle®. In one embodiment, cloud bursting may be implemented with respect to a content server, where a content service is invoked as follows: a client passes request metadata and a request data stream; the service, in response, returns response metadata and a response data stream. Cloud bursting may be applied to asynchronous requests, as it may be difficult to predict with precision how long it would take to process a request in a different cloud.

A read-only machine image comprising a cloud bursting service module may be stored at network storage locations accessible by respective virtualization service hosts that are expected to participate in cloud bursting. Upon a request from a hosted service system, a virtual service host may access the machine image and load the cloud bursting service on an instance of a virtual machine. A diagrammatic representation 100 of an environment within which cloud bursting is taking place is shown in FIG. 1.

As shown in FIG. 1, the environment includes a client computer system (that can be referred to as merely client) 110 and two clouds provided by two virtualization services—a cloud 120 and a cloud 150. The cloud 120 maintains a queue service comprising an input queue 122 and an output queue 124, a local service node 130, and a storage service 140. The local service node 130 comprises one or more instances of a virtual machine executing a computing application, e.g., a content server. The storage service 140 stores content that is maintained by the content server and that can be accessed by and/or manipulated by the client computer system 110. A cloud bursting service executing on the cloud 120 is represented by an offload manager 126 and a response service 128.

The cloud 150 maintains a queue service comprising an input queue 152 and a remote service node 130. The remote service node 150 comprises one or more instances of a virtual machine executing the same computing application as the local service node 130. A cloud bursting service executing on the cloud 150 is represented by a request service 152.

The client 110 makes asynchronous requests to the content server executing on the local service node 130. These requests are stored in the input queue 122. The offload manager 126 examines the queued requests and determines which requests can be "cloud burst"—sent for processing in the cloud 150. The offload manager 126 may be configured to make a determination of whether cloud bursting is appropriate by, e.g., examining the size of the input queue 122, the number of requests stored in the input queue, the rate at which the input queue 122 is being drained or filled, the nature or type of the requests stored in the input queue 122, etc. Monitoring of the input queue 122 could also involve determining whether a particular request may be processed beneficially using specialized hardware that may be available only in another cloud or computing, or determining whether performing an operation in another cloud may be more cost efficient.

For each request to be "cloud burst," the offload manage 126 packages such request (that may be termed an overflow request) as a remote request and sends it to the request service 152 provided in the cloud 150. When the request service 152 returns an acknowledgement of receipt of the overflow request, the offload manager 126 removes the overflow request from the input queue 122 so that it no longer needs to be processed by the local service node 130.

The remote request received by the request service 154 from the offload manager 126 is processed by the remote service node 160. In one embodiment, remote requests received handled by the remote service node 160 do not contain data stream. Instead, the remote service node 160 accesses the storage service 140 maintained by the cloud 120 when it needs to obtain input data for the remote request. Upon processing of the remote request, the remote service node 160 writes the result metadata and the associated data stream to the response service 128 running in the cloud 120. The response service 128, in turn, formats the received result on the output queue 124 so that it is indistinguishable from the perspective of the client 110 whether the request was processed in the cloud 120 or in the cloud 150. While, as shown in FIG. 1, a cloud bursting service executing on the cloud 120 is represented by the offload manager 126 and the response service 128 and a cloud bursting service executing on the cloud 150 is represented by a request service 152, in some embodiments a cloud bursting service provided in a cloud may include all three components (an offload manager, a response service, and a request service) in order to permit cloud bursting in both directions.

Figure 2:
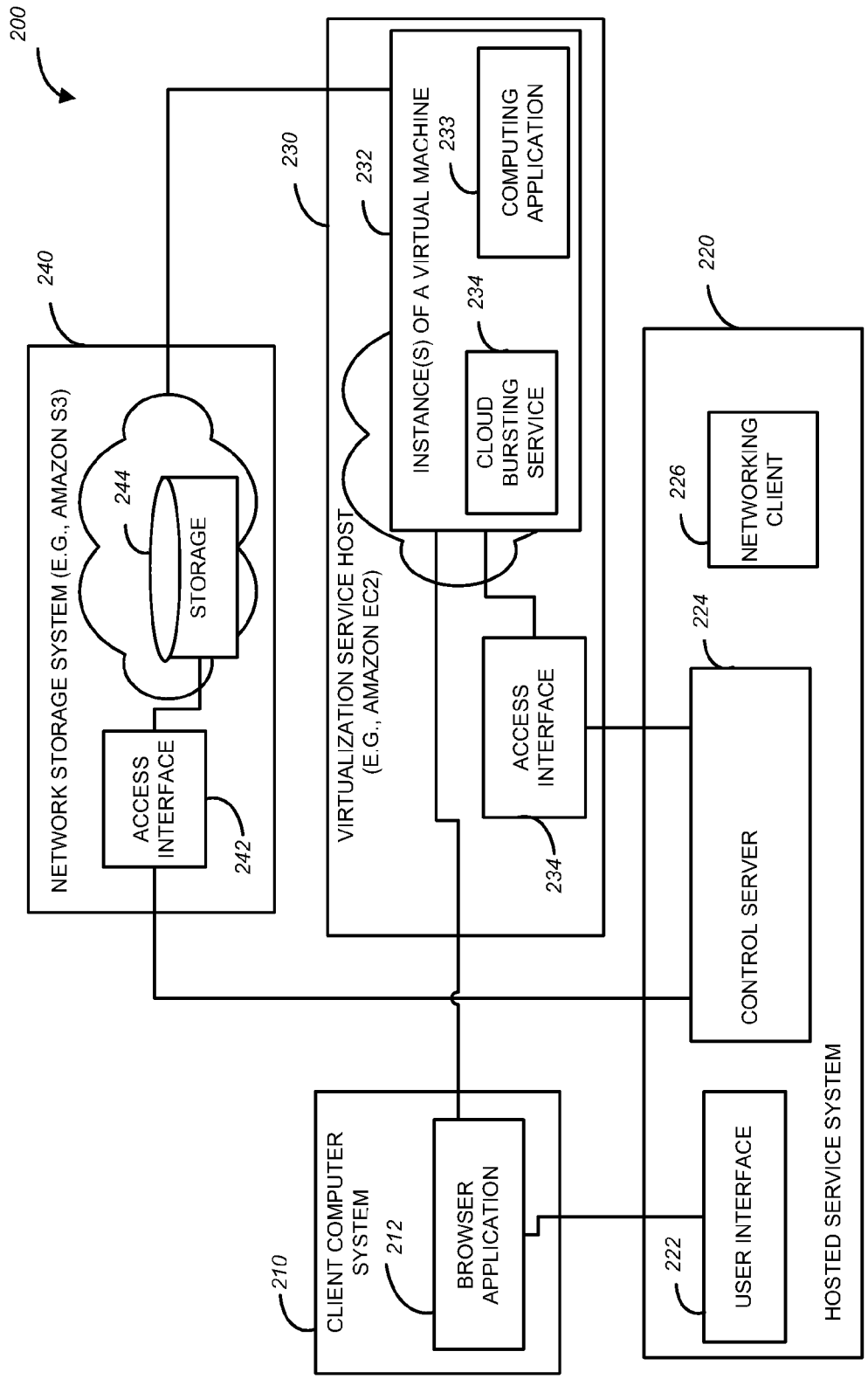
FIG. 2 is a block diagram showing an architecture within which a method and system method to reroute a request received within one virtualization service for processing within another virtualization service may be implemented, in accordance with an example embodiment.

An example architecture within which method and system to provision, on a cloud, a computing application and an associated service provider interface may be implemented is described with reference to an architecture diagram illustrated in FIG. 2. The architecture 200 may include a client computer system 220 (corresponding to the client 110 of FIG. 1) and a hosted service system 220. In one example embodiment, the hosted service system 220 is to provision and manage an enterprise SaaS product utilizing a cloud-based computing service as a virtualization infrastructure. Cloud-based computing services, as shown in FIG. 2, are provided by a virtualization service host 230 and a network storage service 240 (together corresponding to the cloud 120 of FIG. 1). In one embodiment, a hosted service system 220 utilizes Amazon Elastic Compute Cloud (EC2) service as a virtualization service and Amazon Simple Storage Service (Amazon S3) as a network storage service. In some embodiments, the hosted service system 220 may utilize more than one virtualization service host, e.g., one host being Amazon EC2 and another host provided by Adobe Systems Incorporated (that may be viewed as corresponding to the clouds 120 and 150 of FIG. 1). The client computer system 220 and the hosted service system 220 may be in communication with each other via a communications network that may be a public network (e.g., the Internet).

The virtualization service host 230 accesses the storage 144 of the network storage system 140 to obtain one or more machine images in order to load the instance of a virtual machine 232 executing a computing application 231 and a cloud-bursting service 233. In some embodiments, however, the computing application 231 and the cloud-bursting service 233 may be executing on different instances of a virtual machine. Also, while in some embodiments the computing application 231 and the cloud-bursting service 233 may be loaded from the same machine image, in other embodiments the computing application 231 and the cloud-bursting service 233 are loaded from different machine images.

The computing application 231 may be accessed by the client 220 via a browser application 212. As mentioned above, a user in control of the client computer system 220 may send a request to the hosted service system 220 to load the computing application 231. The request may be initiated via a user interface 222 provided by the hosted service system 220 to the client computer system 220 via the browser application 212.

The user interface 222, in one embodiment, provides both an end-user's and a system administrator's view of the computing application 231 and also permits issuing control operations to the computing application 231 and permits viewing the resulting changes in the state of the computing application 231. For example, where a computing application provided by the computing application 231 is a content server, an end-user may manipulate various electronic forms. The user interface 222 may also serve as a source of information for the hosted service system 220, including documentation, downloads, and support. The user interface 222, in one embodiment, uses Adobe® Flex® software, offered by Adobe Systems Incorporated, as the user interface technology for the implementation of the user interface. The user interface 222, in one embodiment, uses an XML (Extensible Markup Language)-based representational state transfer (REST) style secure communications protocol to synchronize its operations with a control server 224. A request to access the user interface 222 may be authenticated using one of a variety of authentication techniques.

The request from the client computer system 220 to load the computing application 231 is received at the control server 224, which responds to the request by activating an access interface 234 provided by the virtualization service host 230. The control server 224, in one example embodiment, provides coordination between the components of the architecture 200, provides administration and monitoring of the virtualization service host 230, and also may be configured to audit system usage and resource allocation with respect to the computing application 231. The control server 224 includes a database to store information pertaining to various aspects of system usage. The control server 224, in one embodiment, runs within a standard Hypertext Transfer Protocol Secure (HTTPS)-compliant web server and may be deployed as a publically accessible web application that is available outside a firewall.

The virtualization service host 230 accesses the storage 244 of the network storage system 240 to obtain one or more machine images in order to load the associated computing application 231 and the cloud bursting service 233. The machine images can be uploaded to the network storage system by the control server 224 utilizing an access interface 242 provided with the network storage system 240. The hosted service system 220 further includes a secure networking client 226 to provide a bidirectional, encrypted, compressed connection between a machine in the end-user's secure network environment (e.g., the client computer system 220) and one or more instances of a virtual machine running within the virtualization infrastructure (the computing application 231). The networking client 226 manages various aspects of transmission control protocol (TCP) traffic forwarding, encryption, and network discovery, such that the user can access the computing application 231 as if it was running locally on the user's machine. In this mode, the user's network security envelope may be extended to surround the computing application 231 using comparable levels of encryption and protection against network security threats.

As explained above, a cloud bursting service (e.g., the cloud bursting service 233) may be used to offload a request directed to a computing application executing in a cloud hosted by one virtualization provider to be processed in a cloud hosted by another virtualization provider (not shown). In order to use cloud bursting from one cloud into another cloud, the hosted service system 220 may provide a machine image for launching the cloud bursting service 234 and a machine image for launching the computing application 233 to respective network storage locations accessible by the two virtualization service hosts that provide the two clouds. As mentioned above, cloud-bursting may also be beneficial for processing certain high-priority requests that could be more quickly handled by another cloud that, e.g., may have specialized hardware that can be leveraged, or for achieving lower costy by sending certain requests to another cloud. Some components of a cloud bursting service are described with reference to FIG. 3.

Figure 3:
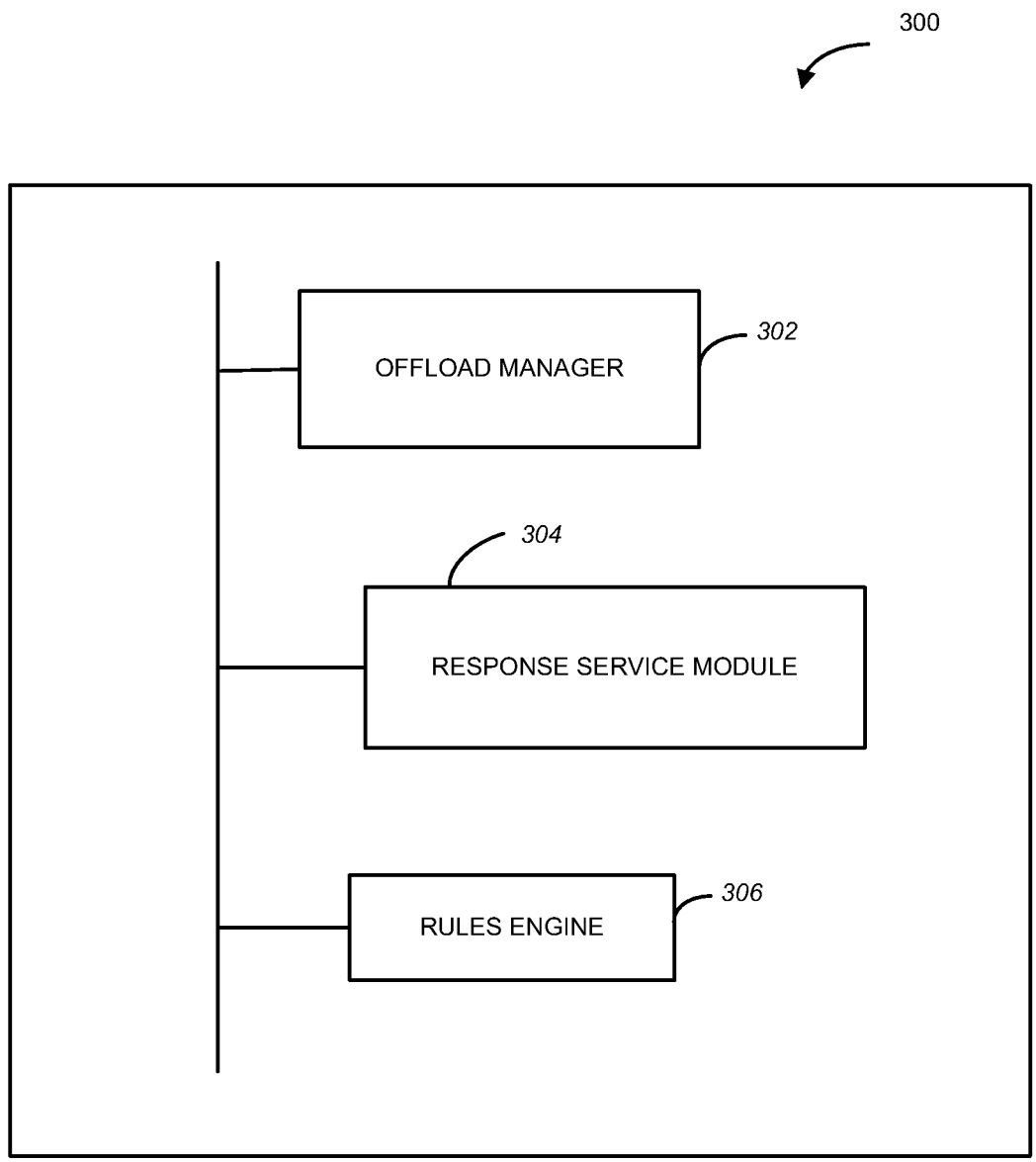
FIG. 3 is a block diagram illustrating some components of a cloud bursting service, in accordance with an example embodiment.

FIG. 3 is a block diagram illustrating a cloud bursting service 300 that corresponds to the cloud bursting service 234 of FIG. 2. The system 300, in one example embodiment, comprises an offload manager 302, and a response service module 304. The offload manager 302 may be configured to determine that an overflow request from a client computer system is suitable for being processed at a computer system provided within a second virtualization service and, in response, reroute the overflow request to a computer system provided within a second virtualization service. The offload manager 302 may also be configured to determine that a state of an input queue provided within the first virtualization service is indicative of overflow requests. The offload manager 302 may also be configured to package the overflow request as a remote request, transmit the overflow request to a request service executing within the second virtualization service, and remove the overflow request from an input queue provided within the first virtualization service.

The response service module 304 may be configured to receive, from a virtual instance of a machine provided within the second virtualization service (the cloud 150 of FIG. 1), a result of processing of the overflow request. The response service module 304 may also prepare the received result for communicating to the client computer system. The cloud bursting service 300 may also include a rules engine 306 configured to store rules for determining that the state of an input queue is indicative of overflow requests. The cloud bursting service 300 may also include a request service module (not shown) that may correspond to the request service 154 shown in FIG. 1, in an embodiment where a cloud bursting service is intended to reroute requests to another cloud, as well as to receive and process rerouted requests from another cloud. Example operations performed by the system 300 are discussed below with reference to FIG. 4.

Figure 4:
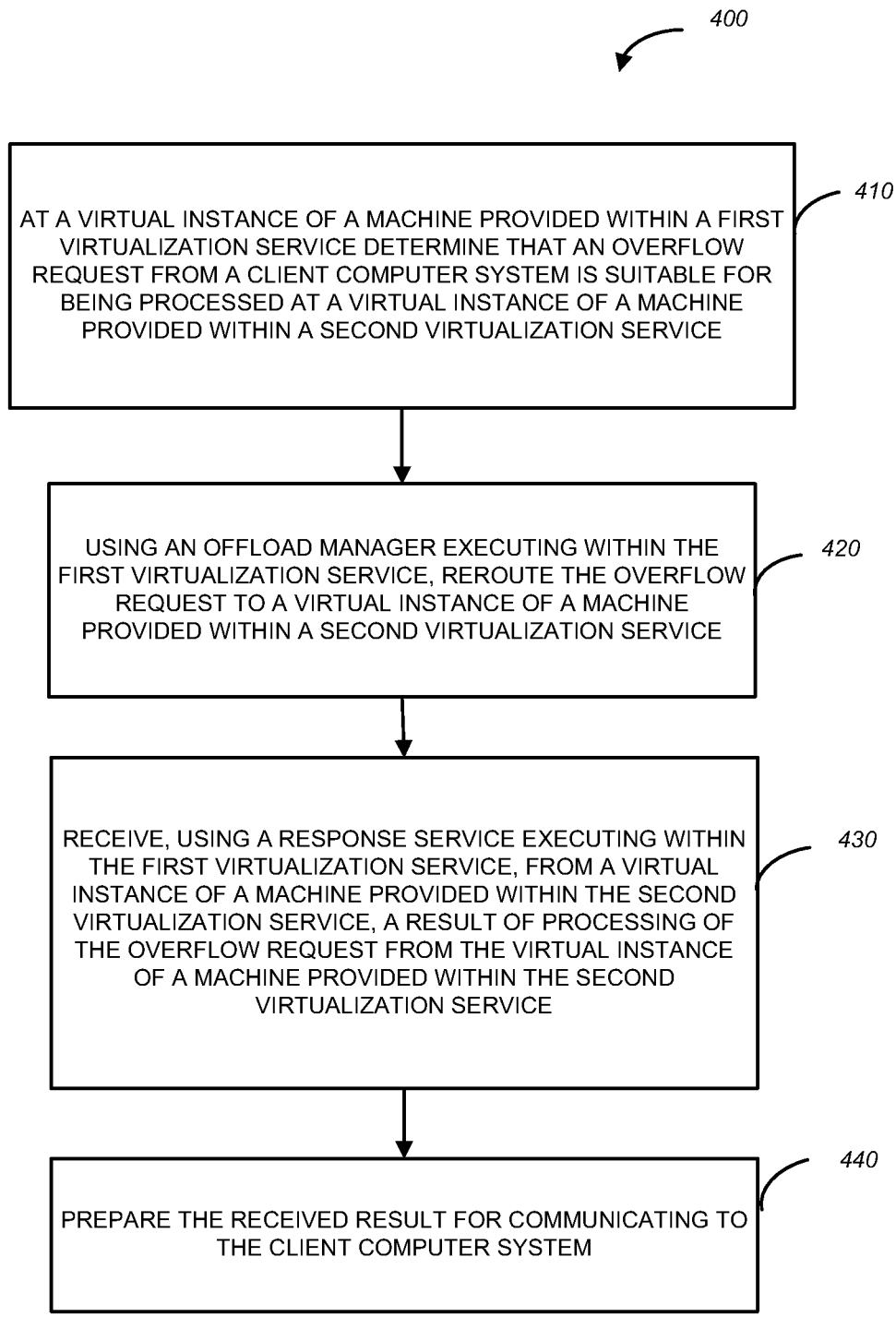
FIG. 4 is a flow chart illustrating a method to reroute a request received within one virtualization service for processing within another virtualization service, in accordance with an example embodiment.

FIG. 4 is a flow chart illustrating a method 400 to reroute a request received within one virtualization service for processing within another virtualization service, in accordance with an example embodiment. The method 400 may be performed by processing logic that may comprise hardware, software (such as run on a general purpose computer system programmed to perform particular functions pursuant to instructions from program software or on a dedicated machine), or a combination of both. The processing logic, according to example embodiments, may reside in or comprise any of the modules shown in FIG. 3.

As shown in FIG. 4, the method 400 commences with operation 410, where the offload manager 302 of FIG. 3 determines that an overflow request received at a virtual instance of a machine provided within a first virtualization service (the cloud 120 of FIG. 1) from a client computer system 110 of FIG. 1 is suitable for being processed at a virtual instance of a machine provided within a second virtualization service (the cloud 150 of FIG. 1). At operation 420, the offload manager 302 reroutes the overflow request to a virtual instance of a machine provided within the second virtualization service. At operation 430, the response service module 304 of FIG. 3 receives, using the response service 154 of FIG. 1 executing within the first virtualization service (the cloud 120), from a virtual instance of a machine provided within the second virtualization service (the cloud 150), a result of processing of the overflow request. At operation 440, the response service module 304 prepares the received result for communicating to the client computer system 110.

Figure 5:
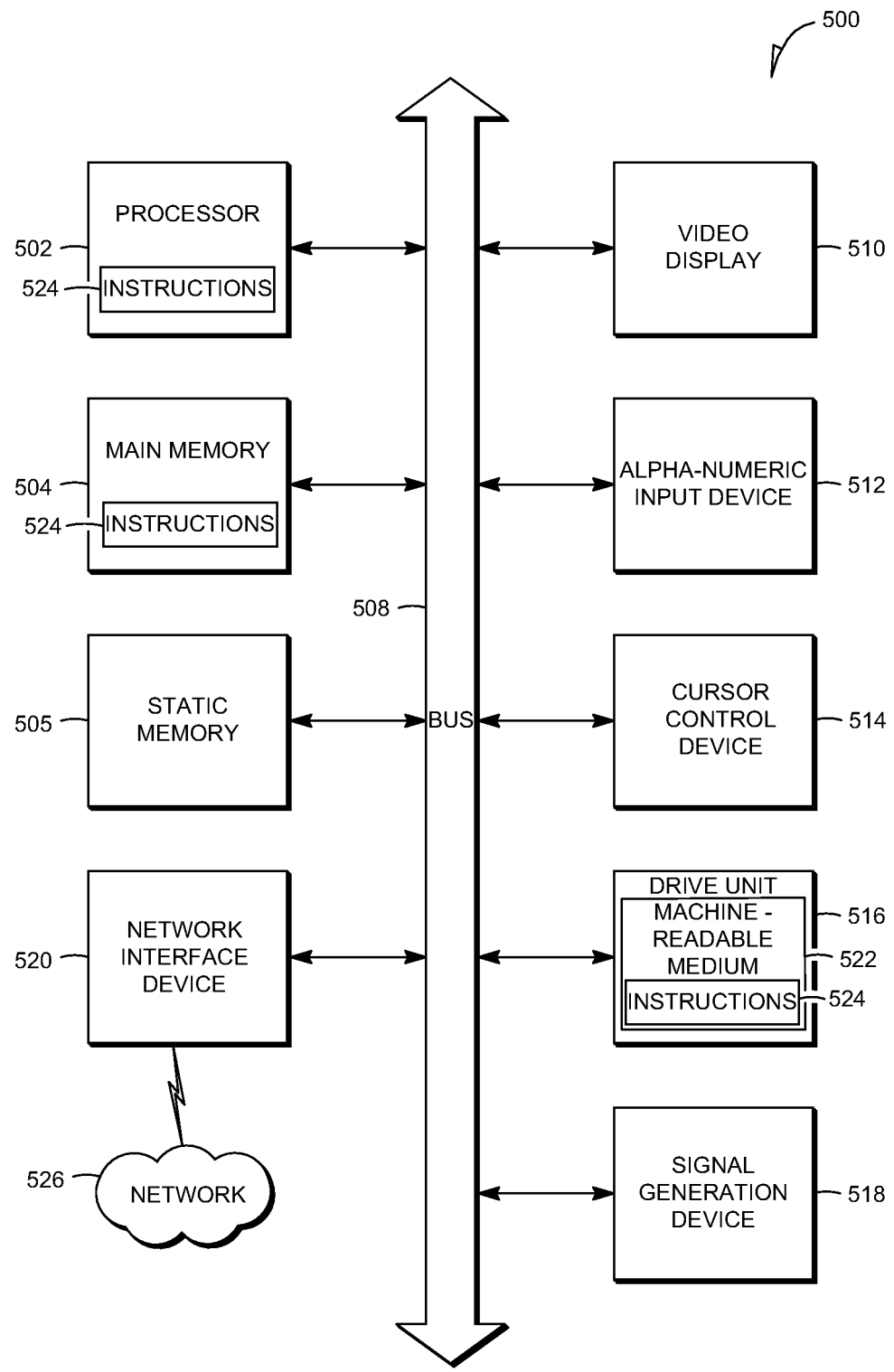
FIG. 5 is a diagrammatic representation of a machine in the example form of a computer system within which a set of instructions, for causing the machine to perform any one or more of the methodologies discussed herein, may be executed.

FIG. 5 is a diagrammatic representation of a machine in the example electronic form of a computer system 500 within which a set of instructions, for causing the machine to perform any one or more of the methodologies discussed herein, may be executed. In various embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a portable music player (e.g., a portable hard drive audio device such as an "Moving Picture Experts Group (MPEG) Layer 3" (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a user interface (UI) cursor control device 514 (e.g., a mouse), a disk drive unit 516, a signal generation device 518 (e.g., a speaker) and a network interface device 520.

The disk drive unit 516 includes a computer-readable (or machine-readable) medium 522 on which is stored one or more sets of instructions and data structures (e.g., software 524) embodying or utilized by any one or more of the methodologies or functions described herein. The software 524 may also reside, completely or at least partially, within the main memory 504 and/or within the processor 502 during execution thereof by the computer system 500, the main memory 504 and the processor 502 also constituting machine-readable media.

The software 524 may further be transmitted or received over a network 526 via the network interface device 520 utilizing any one of a number of well-known transfer protocols (e.g., Hyper Text Transfer Protocol (HTTP)).

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing or encoding a set of instructions for execution by the machine and that cause the machine to perform any one or more of the methodologies of the present invention, or that is capable of storing or encoding data structures utilized by or associated with such a set of instructions. The term "machine-readable medium" shall accordingly be taken to include, but not be limited to, solid-state memories, optical and magnetic media. Such medium may also include, without limitation, hard disks, floppy disks, flash memory cards, digital video disks, random access memory (RAMs), read only memory (ROMs), and the like.

Thus, method and system to reroute a request received within one virtualization service for processing within another virtualization service have been described. Example approaches described herein may be utilized beneficially with a variety of computing applications, such as, e.g., content servers and cloud management systems.

The embodiments described herein may be implemented in an operating environment comprising software installed on a computer, in hardware, or in a combination of software and hardware. Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A method comprising:
at a virtual instance of a machine provided within a first virtualization service executing in a first cloud hosted by a first virtualization provider, determining that an overflow request from a client computer system is suitable for being processed at a virtual instance of a machine provided within a second virtualization service executing in a second cloud hosted by a second virtualization provider;
using an offload manager executing within the first virtualization service, rerouting the overflow request to the virtual instance of the machine provided within the second virtualization service hosted by the second virtualization provider, the first virtualization service to launch a cloud bursting service, to offload the overflow request, on the virtual instance of the machine provided within the first virtualization service by accessing a first read-only boot image from a network storage location accessible by the first virtualization service, a second read-only boot image to launch a request service to receive the overflow request on the virtual instance of the machine provided within the second virtualization service, the second virtualization service accessing the second read-only boot image from a network storage location accessible by the second virtualization service;
receiving, using a response service executing within the first virtualization service, from the virtual instance of the machine provided within the second virtualization service by the second virtualization service, a result of processing of the overflow request within the second virtualization service hosted by the second virtualization provider, the result of the processing being stored to the first cloud hosted by the first virtualization provider by the second virtualization service; and
preparing the received result of the processing of the overflow request for communicating to the client computer system by formatting the received result on an output queue of the first virtualization service that causes the received result to be indistinguishable as to which virtualization service processed the overflow request.

2. The method of claim 1, wherein the determining that the request from the client computer system is suitable for being processed at the virtual instance of the machine provided within the second virtualization service comprises determining that a state of an input queue is indicative of overflow requests.

3. The method of claim 1, wherein the rerouting of the overflow request to the virtual instance of the machine provided within the second virtualization service comprises:
packaging the overflow request as a remote request;
transmitting the overflow request to the request service executing within the second virtualization service; and
removing the overflow request from an input queue provided within the first virtualization service.

4. The method of claim 1, further comprising:
generating the first read-only boot image to be used for launching the cloud bursting service on the virtual instance of the machine provided within the first virtualization service, the cloud bursting service comprising the offload manager and the response service; and
storing the read-only boot image at the network storage location accessible by the first virtualization service.

5. The method of claim 4, further comprising:
generating the second read-only boot image to be used for launching the request service on the virtual instance of the machine provided by the second virtualization service, the request service for receiving the overflow request from the offload manager; and
storing the second read-only boot image at the network storage location accessible by the second virtualization service.

6. The method of claim 1, wherein the first read-only boot image is to be used for launching a request service on an instance of a virtual machine provided by the second virtualization service, the request service is to receive the overflow request from the offload manager executing on the virtual instance of the machine provided by the first virtualization service, the method further comprising:
storing the second read-only boot image at a network storage location accessible by the second virtualization service.

7. The method of claim 1, wherein the determining that the request from the client computer system is suitable for being processed at the virtual instance of the machine provided within the second virtualization service comprises evaluating the request using a rules engine executing within the first virtualization service.

8. The method of claim 1, wherein the request is directed to a content server provided within the first virtualization service.

9. The method of claim 1, wherein the first virtualization service is a public virtualization service.

10. The method of claim 1, wherein the first virtualization service is a private virtualization service.

11. A computer-implemented system comprising:
a hardware processor;
an offload manager executing at a virtual instance of a machine provided within a first virtualization service executing in a first cloud hosted by a first virtualization provider to:
determine, using the hardware processor, that an overflow request from a client computer system is suitable for being processed at a virtual instance of a machine provided within a second virtualization service executing in a second cloud hosted by a second virtualization provider, and
reroute the overflow request to the virtual instance of the machine provided within the second virtualization service, the first virtualization service to launch a cloud bursting service, to offload the overflow request, on the virtual instance of the machine provided within the first virtualization service by accessing a first read-only boot image from a network storage location accessible by the first virtualization service, a second read-only boot image to launch a request service to receive the overflow request on the virtual instance of the machine provided within the second virtualization service, the second virtualization service accessing the second read-only boot image from a network storage location accessible by the second virtualization service; and
a response service module to:
receive, from the virtual instance of the machine provided within the second virtualization service by the second virtualization service, a result of processing of the overflow request within the second virtualization service hosted by the second virtualization provider, the result of the processing being stored to the first cloud hosted by the first virtualization provider by the second virtualization service, and prepare the received result of the processing of the overflow request for communicating to the client computer system by formatting the received result on an output queue of the first virtualization service that causes the received result to be indistinguishable as to which virtualization service processed the overflow request.

12. The system of claim 11, wherein the offload manager is to determine that a state of an input queue provided within the first virtualization service is indicative of overflow requests.

13. The system of claim 11, wherein the offload manager is to:
package the overflow request as a remote request;
transmit the overflow request to the request service executing within the second virtualization service; and
remove the overflow request from an input queue provided within the first virtualization service.

14. The system of claim 11, further comprising a hosted service system to:
generate the first read-only boot image to be used for launching the cloud bursting service on the virtual instance of the machine provided within the first virtualization service, the cloud bursting service comprising the offload manager and the response service; and
store the first read-only boot image at the network storage location accessible by the first virtualization service.

15. The system of claim 14, wherein the hosted service system is to:
generate the second read-only boot image to be used for launching the request service on the virtual instance of the machine provided by the second virtualization service, the request service for receiving the overflow request from the offload manager; and
store the second read-only boot image at the network storage location accessible by the second virtualization service.

16. The system of claim 14, wherein:
the first read-only boot image is to be used for launching a request service on an instance of a virtual machine provided by the second virtualization service, the request service is to receive the overflow request from the offload manager executing on the virtual instance of the machine provided by the first virtualization service; and
the hosted service system is to store the second read-only boot image at a network storage location accessible by the second virtualization service.

17. The system of claim 11, wherein the offload manager is to evaluate the request using a rules engine executing within the first virtualization service.

18. The system of claim 11, wherein the overflow request is directed to a content server provided within the first virtualization service.

19. The system of claim 11, wherein the first virtualization service is a public virtualization service.

20. A non-transitory machine-readable medium in communication with at least one processor, the non-transitory machine-readable medium having instruction which, when executed by the at least one processor of a machine, cause the machine to perform operations comprising:
determining that an overflow request from a client computer system is suitable for being processed at a virtual instance of a machine provided within a second virtualization service executing in a second cloud hosted by a second virtualization provider;
rerouting the overflow request to the virtual instance of the machine provided within the second virtualization service hosted by the second virtualization provider, the first virtualization service to launch a cloud bursting service, to offload the overflow request, on the virtual instance of the machine provided within the first virtualization service by accessing a first read-only boot image from a network storage location accessible by the first virtualization service, a second read-only boot image to launch a request service to receive the overflow request on the virtual instance of the machine provided within the second virtualization service, the second virtualization service accessing the second read-only boot image from a network storage location accessible by the second virtualization service;
receiving, from the virtual instance of the machine provided within the second virtualization service by the second virtualization service, a result of processing of the overflow request within the second virtualization service hosted by the second virtualization provider, the result of the processing being stored to the first cloud hosted by the first virtualization provider by the second virtualization service, and
preparing the received result of the processing of the overflow request for communicating to the client computer system by formatting the received result on an output queue of the first virtualization service that causes the received result to be indistinguishable as to which virtualization service processed the overflow request.

21. The method of claim 1, further comprising providing, to the machine of the second virtualization service, access to a storage service within the first cloud, the storage service comprising input data for the overflow request, the overflow request not containing a data stream having the input data.

* * * * *